Patented June 18, 1929.

1,717,418

UNITED STATES PATENT OFFICE.

MAURICE L. SINDEBAND, OF NEW YORK, AND PHILIP SPORN, OF BROOKLYN, NEW YORK, ASSIGNORS, BY DIRECT AND MESNE ASSIGNMENTS, TO WESTINGHOUSE ELECTRIC & MANUFACTURING COMPANY, A CORPORATION OF PENNSYLVANIA.

MEANS FOR REGULATING VOLTAGE.

Application filed August 9, 1923, Serial No. 656,482. Renewed November 13, 1928.

This invention relates to voltage regulating systems. More specifically it relates to automatic voltage regulating systems and has for one of its objects to provide an automatic voltage regulating system particularly adapted to maintain an alternating E. M. F. or voltage at a substantially constant value.

Other objects are to provide an automatic voltage regulating system which is not only automatic but which is reliable and quickly responsive to slight changes in voltage.

A further object is to provide a novel method, of, and a novel combination of instrumentalities for, maintaining an alternating E. M. F. substantially constant. Other objects and advantages will appear as the invention is hereinafter disclosed.

Referring to the drawings which illustrate what we now consider a preferred combination of instrumentalities to carry out the method:

Figure 1:
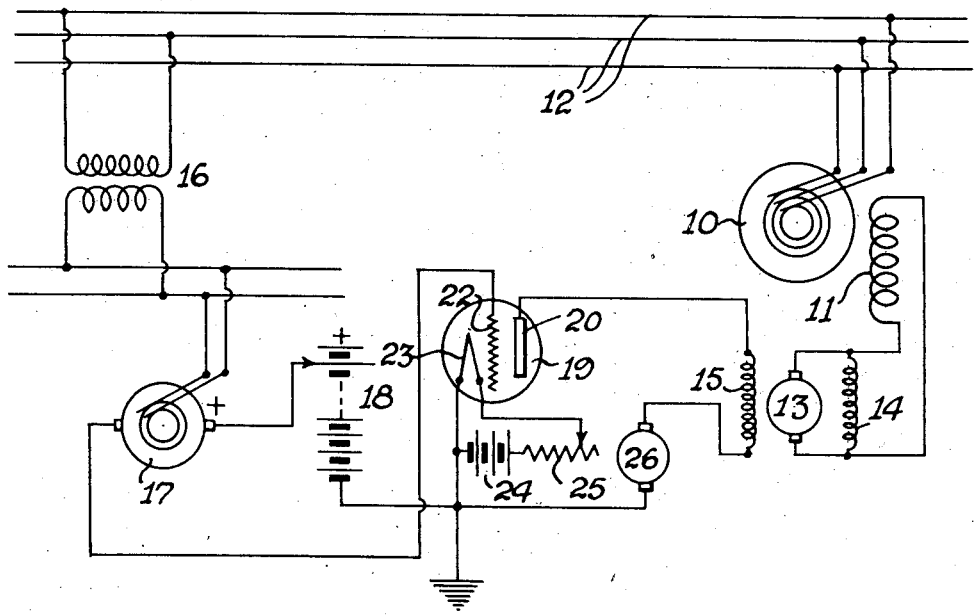
Fig. 1 is a wiring diagram of the system.

While the invention, or at least certain of the features thereof, may be applied to other uses, such as regulation of D. C. potentials, and may be varied within the scope of at least some of the appended claims, we have, to avoid surplusage, illustrated one of the various forms thereof. The method may best be explained by consideration of the apparatus illustrated.

The alternating current generator or alternator 10 is shown as a three-phase generator and is connected to supply the three phase bus or line 12 either directly as shown or through suitable step up transformers if desired. The alternator 10 is provided with a field winding 11, the E. M. F. generated being dependent upon the strength of current flowing through said field. A converter, preferably a synchronous converter 17, is shown connected across one of the three phases 12 through a step down potential transformer 16, it being understood that the latter may be omitted if desired, as where the line or bus voltage is sufficiently low. In the system shown it is desired to maintain the voltage at the point of connection 12—16 substantially constant. The positive terminal of the D. C. side of the converter 17 is shown connected to the positive terminal of a suitable source of direct current such as a battery 18, the negative terminals of the D. C. side of the converter 17 and the battery 18 being connected to the controlling circuit of a tube relay. While other forms of tube relays may be employed we prefer to employ a triode vacuum tube 19 comprising a plate 20, grid 22, and filament 23, all in an evacuated tube or container. The filament 23 is supplied with current by means of a battery 24 and the current may be adjusted by means of a variable resistance or rheostat 25. As is well understood, according to the present theory, the filament when heated acts as an emitter of electrons. The circuit including the grid 22 and filament 23 is commonly called the grid circuit and constitutes the controlling circuit of the tube 19. The circuit including the plate 20 and filament 23 is commonly called the plate circuit and constitutes the controlled circuit of the tube 19. It will be noted that the negative terminal of the battery 18 is shown connected to the filament 23 (and, if desired, to ground) and the negative terminal of the D. C. side of the converter 17 to the grid 22. The battery 18 is designed or adjusted so that its voltage will exceed the normal voltage across the D. C. side of the converter 17. In other words, the E. M. F. across the grid 22 and filament 23 will be equal to the voltage of the battery 18 less the voltage of the D. C. side of the converter 17. Obviously the last mentioned voltage will be directly proportional to the voltage across the line 12.

The exciter 13, shown in the form of a shunt wound generator, is suitably driven and is connected to supply current to the field winding 11 of the alternator 10. Besides the shunt field winding 14, the exciter 13 is provided with a field winding 15 connected in series with a suitable source of constant unidirectional potential, such as a suitably driven generator 26, in the controlled or plate circuit of the tube 19.

Figure 2:
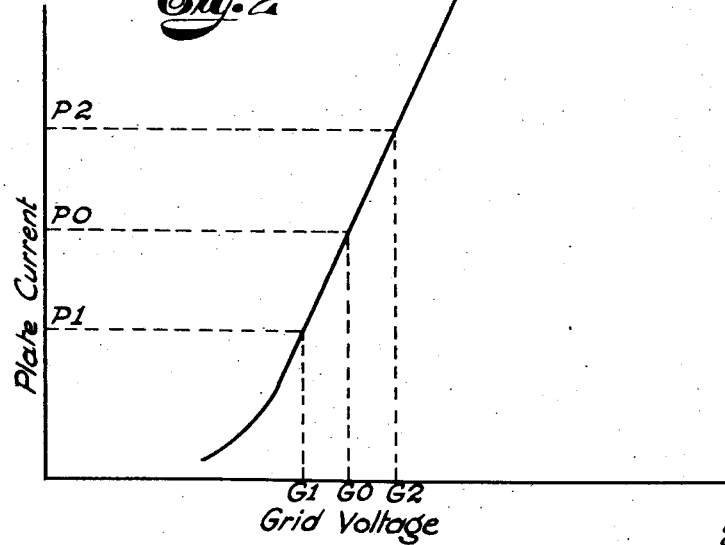
Fig. 2 is a diagrammatic view illustrating the characteristic curve of the tube employed in the system shown in Fig. 1.

Referring to Fig. 2, which illustrates the well known plate-current, grid-voltage characteristic curve of a triode vacuum tube, it will be seen that if the grid voltage is increased from G0 to G2, the plate current will rise from P0 to P2. If the grid voltage drops from G0 to G1 the plate current drops from P0 to P1. In other words, if G0 represents the normal value of the grid voltage of our system, any rise or fall of grid voltage will be accompanied by a rise or fall of plate current. It may be noted at this point that the grid current is comparatively low with respect to the plate current so that no appreciable load is carried by the converter 17 even though the energy in the plate circuit is comparatively high. The ratio of conversion of the machine 17 will therefore be practically constant even though the converter be a comparatively small unit. Furthermore it should be borne in mind that the plate current responds quite quickly to grid voltage variation, this being an extremely important advantage in voltage regulation. The operation of the system may be described as follows.

Assuming that the voltage of the buses 12 is normal, i. e. at the desired value, the system is so designed and adjusted that the grid voltage of the tube 19 is represented at G0 in Fig. 2. If the bus voltage rises, the voltage across the A. C. side of the converter 17 rises, the voltage across the D. C. side of the converter rises, and the grid voltage of the tube 19 falls (it being borne in mind that the voltage of the battery 18 exceeds the normal voltage across the D. C. side of the converter 17). The drop in grid voltage causes a drop in plate current of the tube 19 which weakens the field strength of the exciter 13 and consequently reduces the field strength of the alternator 10. The E. M. F. generated by the alternator 10 therefore decreases. Similarly, a drop in voltage of the bus 13 causes a rise in E. M. F. generated by the alternator 10.

In view of the foregoing disclosure, it will now be appreciated that we have provided a system in which the bus voltage is maintained substantially constant. No contact making voltmeters or springs or similar devices are employed. By proper selection of the voltages of the converter and battery 18, a small change in voltage across the line or bus 12 will cause a much larger change in grid voltage of the tube 19, and consequently in the plate circuit. Thus, if 12 is a 11,000 volt bus, and the normal voltage on the D. C. side of the converter 17 is 600 volts, and the normal grid voltage (G0) is 40 volts (the effective range in the value of grid voltage being between minus 10 and plus 90 volts), a change of 1 per cent in the value of bus voltage will produce a change of 6 volts in the grid voltage, i. e. approximately 6 per cent of the grid voltage range. The response of the system to any change in voltage to be regulated is not only automatic but substantially instantaneous since there is no mechanical inertia. If the line or bus 12 is unbalanced a polyphase converter may be employed and regulation for a change in any or all phases obtained.

In accordance with the provisions of the patent statutes, we have herein described the principle of operation of our invention, together with the apparatus which we now consider to represent the best embodiments thereof, but we desire to have it understood that the apparatus disclosed is only illustrative and that the invention can be carried out by other means. Also, while it is designed to use the various features and elements in the combinations and relations described, some of these may be altered and others omitted without interfering with the more general results outlined, and the invention extends to such use.

What we claim is:

1. A voltage regulating system comprising in combination, an alternating current generator, a tube relay, means controlled by the voltage to be regulated for supplying potential to the controlling circuit of said relay, and means controlled by the current in the controlled circuit of said relay for governing the E. M. F. of said generator.

2. A voltage regulating system comprising in combination, an alternating current generator, a tube relay having a controlling circuit and a controlled circuit, means connected to the controlled circuit of said relay for governing the E. M. F. of said generator, means for converting alternating current to direct current and connected to the controlling circuit of said tube relay, and means for supplying said second mentioned means with E. M. F. proportional to the voltage to be regulated.

3. A voltage regulating system comprising in combination, an alternating current generator, a synchronous converter supplied by said generator, a vacuum tube having a controlling circuit connected to the D. C. side of said converter, and means connected to the controlled circuit of said tube and responsive to variations in voltage on the A. C. side of said converter for controlling the E. M. F. generated by said generator.

4. A voltage regulating system comprising in combination, a synchronous converter and means for impressing on the A. C. side thereof a voltage proportional to the voltage to be regulated, a source of direct current, a tube relay, means for impressing the difference of potential between said source and the D. C. side of said converter upon said relay, and means controlled by said relay for governing the voltage to be regulated.

5. In combination, a generator of alternating current, a synchronous converter energized by said generator, a source of direct current, a triode vacuum tube, means connecting the D. C. side of said converter and said source in opposition in the grid circuit of said tube, an exciter for supplying field current to said generator, and means connecting a field winding of said exciter in the plate circuit of said tube.

6. In combination, an A. C. line, a generator of alternating current supplying said line, a synchronous converter, a step-down transformer connected between said line and the A. C. side of said converter, a translating device comprising a hot and two cold electrodes, a source of direct current, means connecting the D. C. side of said converter and said source in opposition across the hot and one cold electrode of said device, an exciter for supplying field current to said generator, and a circuit including a field winding of said exciter connected across the hot electrode and the other cold electrode of said device.

In testimony whereof we hereto affix our signatures.

MAURICE L. SINDEBAND.
PHILIP SPORN.